Patented Oct. 25, 1927.

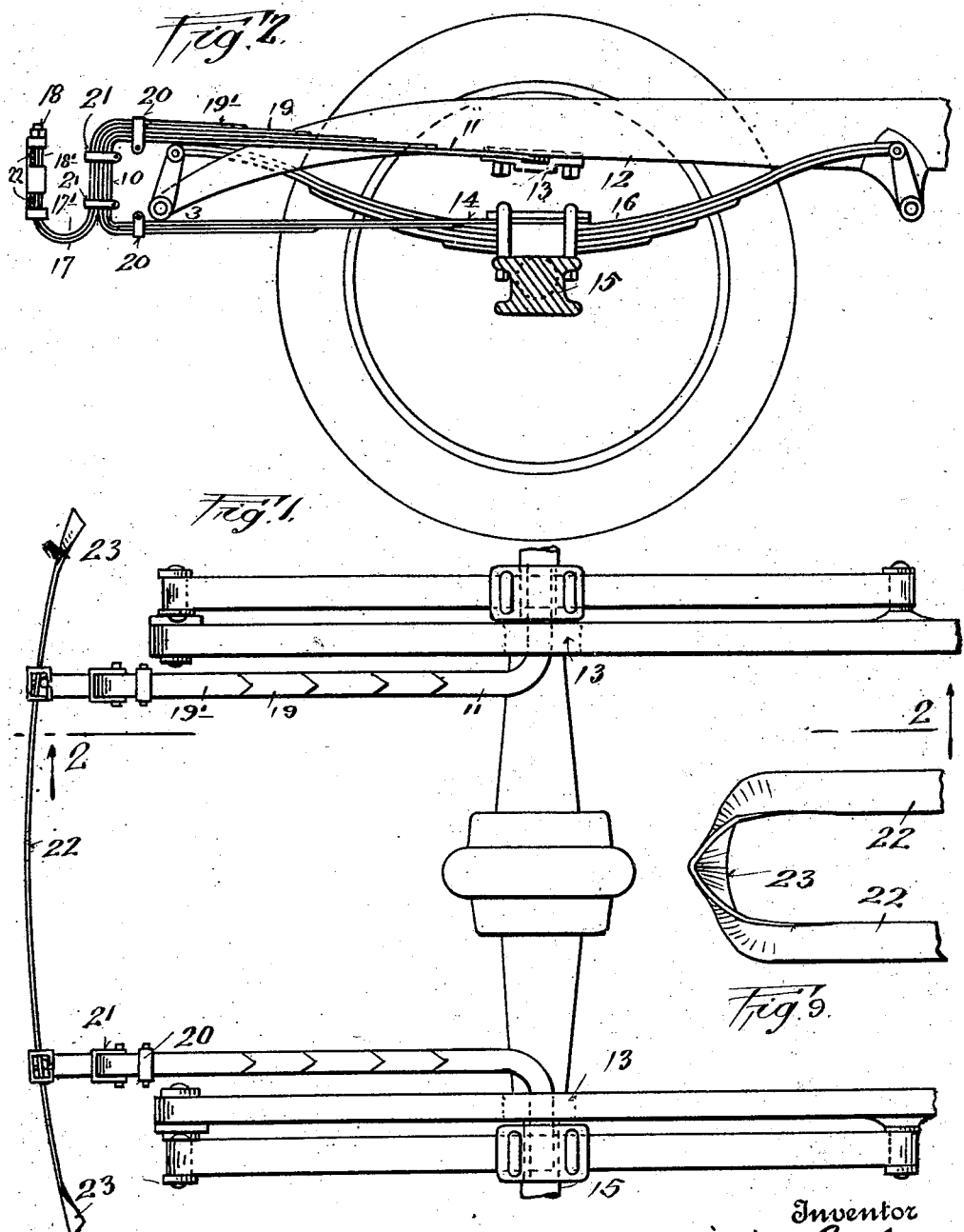

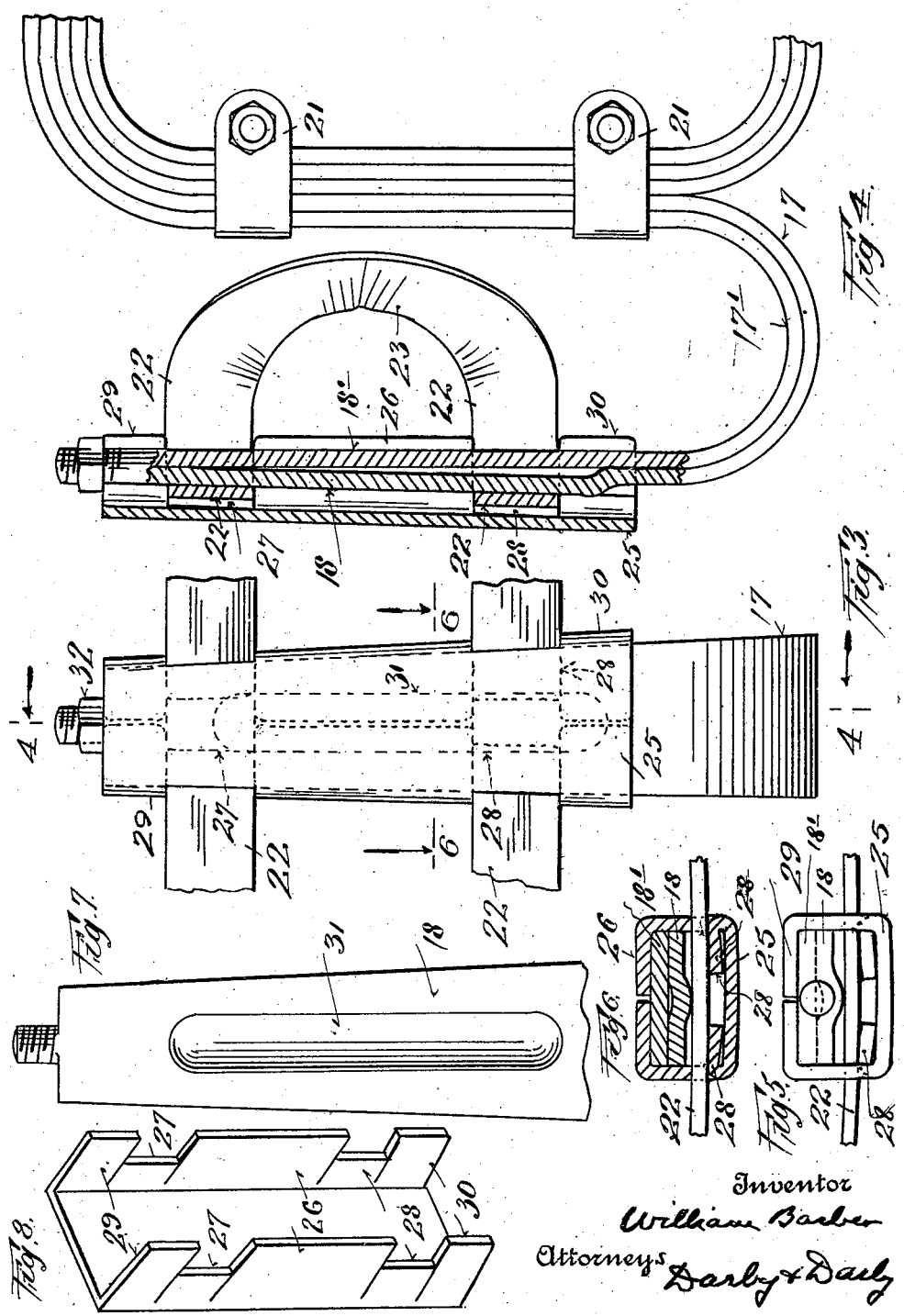

1,646,518

UNITED STATES PATENT OFFICE.

WILLIAM BARBER, OF BROOKLYN, NEW YORK.

SHOCK ABSORBER AND BUFFER.

Application filed March 29, 1924. Serial No. 702,722.

This invention relates to improvements in buffers and shock absorbers, and is in part a continuation of my pending application Serial No. 454,397, filed March 22, 1921, and patented December 29, 1925, as No. 1,567,781.

The objects of my invention include the provision of a combined shock absorber and buffer which is simple in structure, economical to manufacture, efficient in operation and readily attached to varying types of cars without the necessity of drilling holes in either the car or the buffer.

Another object includes the provision of a shock absorbing device which will absorb the ordinary vertical jars and rebound shocks due to the operation of the car over rough places.

Another object includes the provision of a device of the nature indicated which will constitute a buffer to take and absorb the impact of a collision.

Other objects will appear hereinafter, and I attain these objects by the device illustrated in the accompanying drawings, in which:—

Fig. 1 is a plan view of my device, attached.

Fig. 2 is a side elevation thereof taken on line 2—2 of Fig. 1 and showing the manner of attachment to the parts of a car.

Fig. 3 is an end view of one of the buffer holders.

Fig. 4 is a view taken on the line 4—4 of Fig. 3.

Fig. 5 is a top view of the holder shown in Fig. 3.

Fig. 6 is a section taken on line 6—6 of Fig. 3.

Fig. 7 is a view in elevation of the buffer holding bar.

Fig. 8 is a view in perspective of the buffer holding blank.

Fig. 9 is a view of one end of the buffer illustrating the fold or turn.

Like numerals refer to similar parts throughout the several views.

According to modern automobile practice, it is the custom to equip the machine with buffers or fenders, sometimes on the front, sometimes at the rear, and sometimes at both front and rear, the purpose and function of which are to take the initial shock of collision and absorb the same, thereby preventing or reducing injury to the more vital parts of the machine.

It is also common to employ shock absorbing devices between the body of the car and its supporting chassis or frame.

Various forms of these devices have been devised and are in extensive use, but, so far as I am aware, such devices, as heretofore proposed and used, have been wholly independent of each other, and each is usually regarded as an auxiliary device, any one or more or all of them to be obtained and applied, or omitted, according to the tastes and desires of individual car owners, and their ability to purchase and pay for the same. Since such devices are often regarded as specialties and, to some extent at least, unnecessary, an auxiliary equipment including all of them adds very appreciably to the cost in purchasing a car where they form part of the regular equipment of the car. And where such devices do not form part of the car equipment when the car is purchased, which is the most common practice, and have to be purchased separately and applied to the car by the individual car owner, the cost often is regarded as too great a burden, with the result that many car owners fail to equip their cars with such devices and consequently fail to realize the protection, ease and comfort which such devices afford.

It is among the special purposes of my invention to provide a single structure which combines within itself the functions of a buffer or fender and of a shock absorber, and which can be quickly and readily applied to (or removed from) the chassis or automobile supporting frame as an entity without the necessity of drilling holes for bolts or fastening clamps.

In carrying out my invention, I propose to construct a framework preferably of sheet steel stampings, and which possesses a desirable resiliency, not only to serve as a fender or buffer in case of collision but also to take and absorb the shocks and vibrations due to the car operation. This frame may be mounted for use either at the front or rear end, or at both ends of the car, and in such relation to the car body and its supporting frame or chassis, to which the device is connected, as to occupy the position ordinarily occupied by buffer or fender devices at present in use. In other words, the frame of the combined device of my invention is connected to and supported upon the automobile to extend transversely across the one or the other or both ends thereof, and in such manner as to yieldingly oppose any shock of collision, and absorb the same. The shock absorbing function of the device is secured by so connecting the frame of the device respectively to the body of the automobile and to the chassis, as to resist, through the natural resiliency of the frame, relative movements of the body and chassis. In this connection, and if desired, the natural resiliency of the frame of the device may be supplemented by suitable supplementary springs.

In the accompanying drawings, I have shown various structures and arrangements illustrative of the principles of my invention, but it is to be understood that the invention may be carried into practice in many different structures and arrangements. I do not desire, therefore, to be limited or restricted, in the broader scope of my invention, as defined in the claims, to the specific structures and arrangements shown and now to be described.

Referring now to the drawings, I provide a main buffer supporting and shock absorbing frame 10, which is composed preferably of sheet steel stampings in U-shape, the inner one of which has its upper end 11 attached to the chassis 12 in any suitable manner, as by a clevis 13. The lower end or plate 14 of the inner member of the main frame is attached to the axle or the axle housing 15 and preferably, though not necessarily, it is assembled with the spring member 16, either on the frame at the rear or on both front and rear. To provide for the rebound of the car body and for the shock absorbing features, I build up the frame 10 of a number of spring elements in U-shape, each successive member of which is somewhat shorter than its preceding member, as is best shown in Fig. 2. Carried upon this laminated frame is the buffer supporting member 17, which for greater resiliency is also built up of a number of superimposed members 17, 17', which terminate at one end in the buffer carrier tapered arms 18, 18' and at the other in the spring leaf holding arms 19, 19'. The spring leaf parts of the buffer supporting member not only serve in taking up the shock in case of collision, but the ends 19, 19' serve also as additional shock absorbers. The several members of the two frames are held together by suitable clamps 20 and 21.

The buffer member comprises a pair of parallel resilient members 22, preferably in a continuous piece and bent at the outer parts in what I will call a ribbon fold 23. The ends of the bars may be welded together so that the entire buffer comprises a unitary endless structure with parallel bars spaced apart and shaped at the ends upon themselves in the ribbon fold named above. Preferably, though not necessarily, the buffer is curved outwardly, as is best shown in Fig. 1.

The buffer is held on its support by a clamping member 25, the blank form of which is illustrated in Fig. 8. This blank is stamped out of a piece of sheet metal and comprises the spacing pieces 26, the upper and lower fold pieces 27 and 28, and the upper and lower end folds 29 and 30. This clamp is tapered slightly to fit the tapered buffer supporting ends 18 and 18', over which the spacing pieces and end folds are pressed to engage and hold the bumper bars 22 in the space provided by flatly folding the fold pieces. This form of clamp construction provides a wedging clamp which, with the rib extension 31 on one of the arms (18' in this case) engages and holds the buffer members under tension. A nut 32 secures the parts against rattling.

The buffer member is easily applied by simply lifting off the clamp, inserting the limbs 22 of the buffer and pressing the parts together. Nut 32 is then applied to hold the parts secured. The single piece ribbon fold buffer provides a safe and effective buffer of neat appearance which is not weakened by bolt holes or otherwise, and which may be quickly applied to cars of widely different designs. The spring support also provides against shock due to collisions, and the shock absorber protects the springs of a car against breaking when traveling rapidly over rough roads. Since the resilient leaf spring members 19 and 19' of the resilient buffer carrier extend well over the shock absorbing U-shaped spring member, these parts serve also to further protect the car springs from rebound shocks.

Having now described my invention, what I claim as new and useful, of my own invention, and desire to secure by Letters Patent, is:—

1. In a buffer and shock absorbing mechanism, a buffer member having parallel bars and end folds in combination with a resilient supporting member, said member resiliently supported at its ends on relatively vertically movable portions of an automobile to serve as a shock absorber.

2. In a buffer and shock absorbing mechanism, a buffer member having parallel bars and end folds in combination with a resilient buffer supporting member and a second resilient shock absorbing member, said members acting in unison to serve as shock absorbers for limiting the vertical movements of the car body due to rebound.

3. In a buffer and shock absorbing mechanism, a buffer member comprising parallel flat bars with end ribbon folds and resilient supporting frames, said frames functioning also as shock absorbers to limit the rebound vertical movements of the car body and wheel support.

4. In a combined buffer and shock absorbing attachment for automobiles, a resilient frame member having one of its ends attached to the frame of a car and the other to the car axle, and a member extending from said resilient frame member for attaching a buffer member.

5. In a combined buffer and shock absorbing attachment for automobiles, a pair of resilient U-shaped members, each having one extremity attached to the car frame and the other to the running gear of the car, and an intermediate member for carrying a buffer.

6. In a combined buffer and shock absorbing attachment for automobiles, a pair of resilient U-shaped members, each having one extremity attached to the car frame and the other to the axle housing of the car, a second resilient member attached to each of said U-shaped members at its U-bend, said second resilient members terminating in holding devices for carrying a buffer.

7. In a combined buffer and shock absorbing attachment for automobiles, a pair of resilient U-shaped members, each having one extremity attached to the car frame and the other to the axle housing of the car, a second resilient member attached to each of said U-shaped members at a point intermediate the ends, and a single uniform ribbon folded buffer member clamped on to said second resilient member.

8. A combined buffer and shock absorbing attachment for automobiles, which includes a flexible U-shaped framework having one end attached to the car frame and the other to the spring clevis of the car axle housing, a buffer carrying resilient frame having one end attached to the flexible U-shaped frame and providing shock recoil resistance for said U-shaped member.

9. A combined buffer and shock absorbing attachment for automobiles, which includes a flexible framework having means for attaching the same respectively to the car frame and to the car axle and housing, and an intermediately attached resilient frame for supporting a buffer, said frame serving also to resist the recoil of the car body.

10. A combined buffer and shock absorbing attachment for automobiles, which includes a flexible framework having means for attaching the same respectively to the car frame and to the running gear, and an auxiliary spring member to supplement the resiliency of the framework in resisting the relative movement of the car body and frame.

11. A combined buffer and shock absorbing attachment for automobiles, which includes a flexible framework having means for attaching the same respectively to the car frame and to the car axle and housing, and an auxiliary spring member carried by each flexible framework, and a buffer having a ribbon fold at either end carried by said auxiliary spring member.

12. A combined resilinet buffer carrier and shock absorber comprising a plurality of U-shaped resilient members clamped together and having free ends for carrying a buffer on the one hand, and on the other for attaching to the parts of an automobile to limit the vertical movements of the car body and car wheels.

13. In a combined buffer and shock absorber, a main spring member having its ends fastened to separate parts of an automobile, a plurality of auxiliary plates carried on said main spring member to form reinforcing members on the one hand and to serve as buffer carriers on the other.

14. In a combined buffer and shock absorber, a main spring member having its ends fastened to separate parts of an automobile, a plurality of auxiliary plates carried on said main spring member to form reinforcing members on the one hand and to serve as buffer carriers on the other, clamp members on the buffer carriers, and buffer members secured to said carriers by said clamp members.

15. A clamp member for securing buffer bars on to the carrier frame, comprising a flat stamping of tapered form, having spacing ears bordered by buffer seats, and outer securing members for wedgingly engaging the carrier frame.

In testimony whereof I have hereunto set my hand on this 22nd day of March, A. D., 1924.

WILLIAM BARBER.